Sept. 25, 1934.          D. A. SCARNEGIE          1,974,511
                            WORKHOLDER
                         Filed Jan. 22, 1932
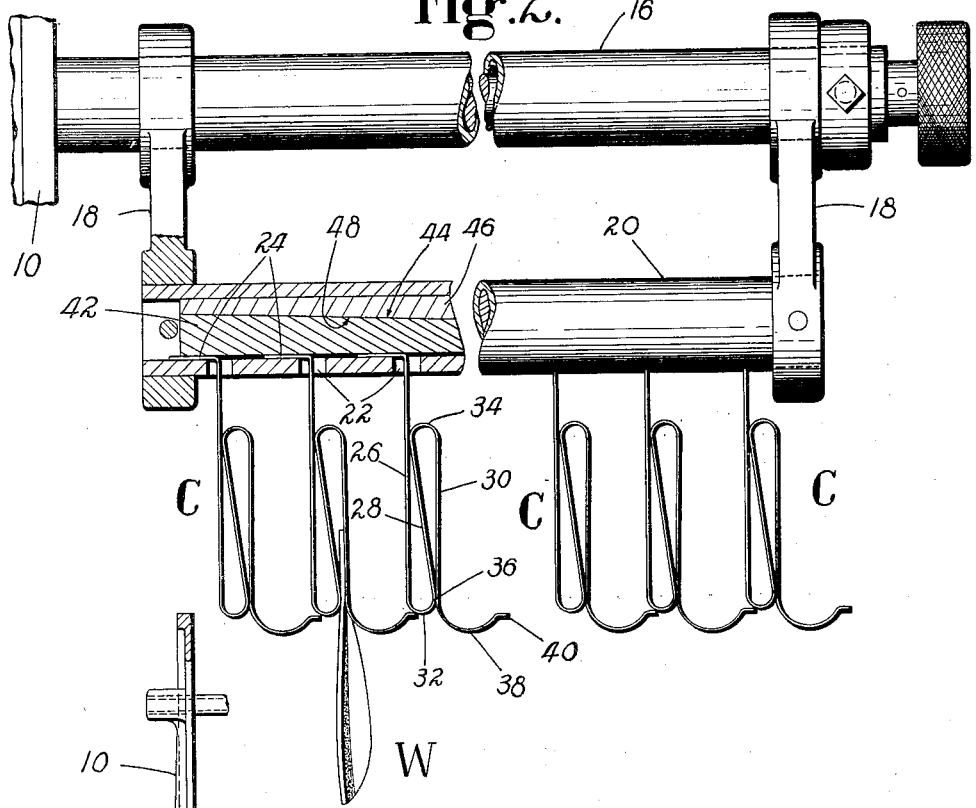
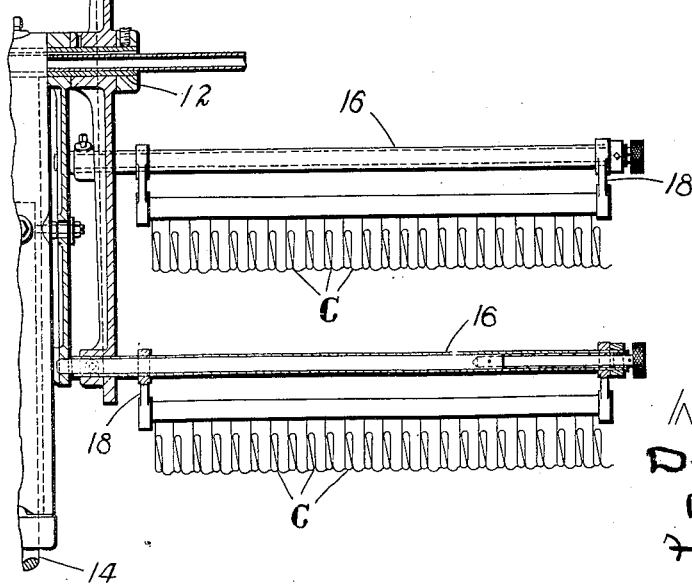
INVENTOR
Daniel A. Scarnegie
By his Attorney,
Harlow M. Davis Patented Sept. 25, 1934

1,974,511

UNITED STATES PATENT OFFICE 1,974,511

WORKHOLDER

Daniel A. Scarnegie, Peabody, Mass., assignor to United Shoe Machinery Corporation, Paterson, N. J., a corporation of New Jersey Application January 22, 1932, Serial No. 588,178

11 Claims. (Cl. 211—89)

This invention relates to means for temporarily holding work-pieces after an operation has been performed upon them and in preparation for a succeeding operation. One use for which the invention is well adapted is the supporting out of contact with one another of cemented portions of shoes which await utilization by an operator. While in no sense limited to such application, my work-holder may conveniently be combined with the drying rack disclosed in Letters Patent of the United States No. 1,776,117, Cosgrove, September 23, 1930.

An object of this invention is to provide, in a relatively simple manner, for holding work-pieces so they are securely retained against accidental displacement, yet may readily be put in place and withdrawn by an operator. For the attainment of this object, I employ a series of clips mounted side by side upon a carrier and secured in place thereon. In this relation, a projection from one clip will constantly overlap the adjacent clip, thus completely closing the open space between the two, in which space there would be no work-retaining means. The work-pieces are consequently unfailingly directed for engagement by the clips.

A further object of the invention is to mount securely a clip or a series of clips upon a carrier member by easily applied efficient and inexpensive means. To this end, when there are a plurality of the clips mounted upon a carrier member, a novel securing means is employed common to them all. Whether there are one or more clips, the mounting means which I prefer includes a carrier-tube having one or more openings to receive portions of the clip or clips, there being a securing member situated within the tube and engaging the clips. Herein is shown a second securing member contacting with the first in the tube, said members preferably having oppositely inclined contact-faces. This allows one of the members to be introduced in the tube to retain a series of the clips in place, and then locked, in contact with the clips, by the introduction of the second member, without longitudinal movement of the first.

A particular embodiment of my invention is illustrated in the accompanying drawing, in which Fig. 1 shows in broken side elevation my improved holder in place upon a rack; while Fig. 2 illustrates one of the holders enlarged and in broken side elevation.

In Fig. 1 there appears at 10 one of the wheels of the Cosgrove rack previously mentioned, this wheel being rotatable about a horizontal spindle 12 projecting from a standard 14. Such movement of the wheel permits any one of a plurality of work-supporting spindles 16 extending horizontally from the outside of said wheel to be conveniently positioned for access by an operator. Each spindle 16 preferably bears one of the work-holding assemblies of the present invention. These may be identical, so but one will be described in detail.

Free to turn about a spindle 16 near its extremities are spaced arms 18, 18 having fixed in their ends a horizontal carrier-tube 20. As the wheel 10 rotates, the weight of the arms and the elements which they support maintains them vertical. Along the tube 20 is a series of relatively small horizontally alined openings 22, each being for the purpose of receiving the angular end 24 of a clip C. This clip is formed from a comparatively thin narrow strip of steel or other spring-stock, the portion 24 being bent from a main supporting member or stem 26, which occupies a substantially vertical position upon the tube. At the lower end of the stem, the material of the clip is bent back upon itself inwardly to give an upwardly extending arm 28, and then downwardly and outwardly to furnish an arm 30. There is thus produced a rounded connecting portion 32 between the stem and the arm 28, and a second rounded portion 34 connecting the arms 28 and 30. The portions 28, 34 and 30 together constitute an elongated loop, the arms of which converge downwardly into contact at 36, where they give opposite work-engaging surfaces normally forced together by the resilience of the loop. The lower extremity 38 of the arm 30 is curved first downwardly and then upwardly and terminates in an end 40, which may lie substantially at right-angles to the stem, being approximately horizontal. The curved portions 32 and 38 provide a tapered throat, which facilitates the introduction of the work-pieces between the engaging surfaces at 36. Each clip-end 40 preferably extends somewhat over the portion 32 of the next clip, and consequently, with the portion 38, completely bars the entrance of the work between adjacent clips and directs them to the work-receiving throat of one or the other of said clips, to be retained at 36.

Within the tube 20 and engaging all the clip-ends 24 is a securing member 42. As illustrated, this member 42 is common to the entire series of clips C carried by a tube 20, and may consist of a rod of wood divided longitudinally along an inclined plane 44. The rounded lower side of this member rests upon the ends 24 of the clips and is forced against them by a locking rod 46 having a lower face 48 inclined upon an angle complemental to that of the surface 44. The members 42 and 46 thus constitute co-operating wedges. In assembling the clips C upon the carrier-tube, they are tilted one by one so their ends 24 may be introduced through the openings 22. When all are thus preliminarily placed, the rod 42 is inserted in the tube, with the inclined face 44 upmost, and moved to its proper longitudinal relation over all the clips. Then the rod 46 is introduced, its face 48 moving along the face 44 of the rod 42 until finally its upper curved side engages the tube-wall above it, forcing the rod 42 firmly against the clip-ends 24 and locking the entire series in place. Since there is no travel of the rod 42 while under pressure in engagement with the clip-ends, there is no tendency to score the wood and thus impair the firm, uniform binding effect.

In using my improved holder, one of the spindles 16 will be so placed by turning the wheel 10 that the series of clips C carried upon it is convenient for access by an operator, who may be engaged in cementing the work. As pieces W are coated, the operator introduces them separately between different clip-surfaces at 36. In so doing, she is assisted by the tapered throat formed by the curved portions 32 and 38, and misplacing of pieces is guarded against by the complete closure of the spaces between the clips by the portions 38 with their extensions 40. The considerably elongated loop, made up of the portions 28, 34 and 30, provides the proper resilience to allow the operator to readily insert the pieces between the surfaces 36 without undue resistance, yet exerts ample force to retain them in place. A series of clips having been filled by the work-pieces, the wheel 10 may be turned to bring a new series into place, and the filled series may later, after the cement has become somewhat tacky, be removed one by one by an operator who is to use them. At this time, the resilience of the loop renders the withdrawal of the pieces easy.

Having described my invention, what I claim as new and desire to secure by Letters Patent of the United States is:

1. The combination with a carrier, of a series of spring-clips of bent metal spaced from one another upon the carrier, means for securing the clips to the carrier, said securing means permitting only movement of the clips due to their resilience, each clip having a work-engaging throat and a portion extending from one side of the throat and overlapping the open space between it and the adjacent clip, the space being thereby at all times completely closed and the work-pieces directed into the throat.

2. The combination with a carrier, of a series of clips spaced from one another upon the carrier, each clip having a stem fixed against movement upon the carrier at its point of engagement therewith, a loop formed at the end of the stem and furnishing opposite surfaces to engage the work, and a projection from the loop constantly overlapping the outer extremity of the adjacent stem.

3. The combination with a carrier-tube provided with an opening, of a clip having a portion extending through the opening into the tube, a securing member situated within the tube and retaining the clip in place upon the tube, and a locking member for the securing member, said locking member being forced into engagement with the securing member and with the interior of the tube.

4. The combination with a carrier-tube provided with an opening, of a clip having a portion extending through the opening into the tube, a securing member situated within the tube and retaining the clip in place upon the tube, and a second securing member contacting with the first and with the interior of the tube, said securing members having oppositely inclined contact-faces.

5. The combination with a carrier-tube provided with a series of openings, of a clip corresponding to each opening and having a portion extending through said opening into the tube, a wedge contacting within the tube with all the clips and securing them in place, and a locking wedge engaging the securing wedge.

6. The combination with a carrier-tube provided with a series of openings, of a clip corresponding to each opening and having a stem extending through said opening, upon which stem is an angular end for engagement with the inside of the tube, the stem outside the tube being continued by a loop furnishing opposite surfaces to engage the work, and a securing member extending through the tube and contacting with the angular portions of all the clips.

7. The combination with a carrier-tube provided with a series of openings, of a clip corresponding to each opening and having a stem extending through said opening, upon which stem is an angular end for engagement with the inside of the tube, the stem outside the tube being continued by a loop furnishing opposite surfaces to engage the work, a securing member extending through the tube and contacting with the angular portions of all the clips, and means for forcing the securing member against said angular clip-portions.

8. The combination with a carrier-tube provided with an opening, of a clip extending through the opening and having an end portion contacting with the inner wall of the tube, a member contacting with the end portion of the clip to force it against the tube-wall, and means contacting with the opposite side of the tube from the clip for forcing the member transversely of the tube and against the clip.

9. The combination with a carrier-tube provided with an opening, of a clip extending through the opening and having an angular end portion extending from the tube-opening in contact with the inner wall of the tube, and opposed securing members contacting with each other within the tube, one of said members engaging the end portion of the clip and the other engaging the opposite wall of the tube.

10. The combination with a carrier-tube provided with a longitudinal series of spaced openings in its wall, of a spring-clip having a stem extending through each opening and terminating in an angular portion contacting with the inner wall of the tube, there being a clip for each tube-opening, a securing member extending longitudinally of the series of clips and engaging the angular portions thereof within the tube, and a locking member for the securing member extending longitudinally of the tube in contact with the wall opposite the clips.

11. The combination with a carrier-tube provided with a series of spaced openings in its wall, of a spring-clip having a stem extending through each opening and terminating in an angular portion contacting with the inner wall of the tube, there being a clip for each tube-opening, a securing member common to the series of clips and engaging the angular portions thereof within the tube, and a second clip-securing member contacting with the first and with the opposite tube-wall.

DANIEL A. SCARNEGIE.